Dec. 18, 1923.
R. D. HUGHES
SHOCK ABSORBER
Filed Oct. 4, 1922
1,477,959
2 Sheets-Sheet 1
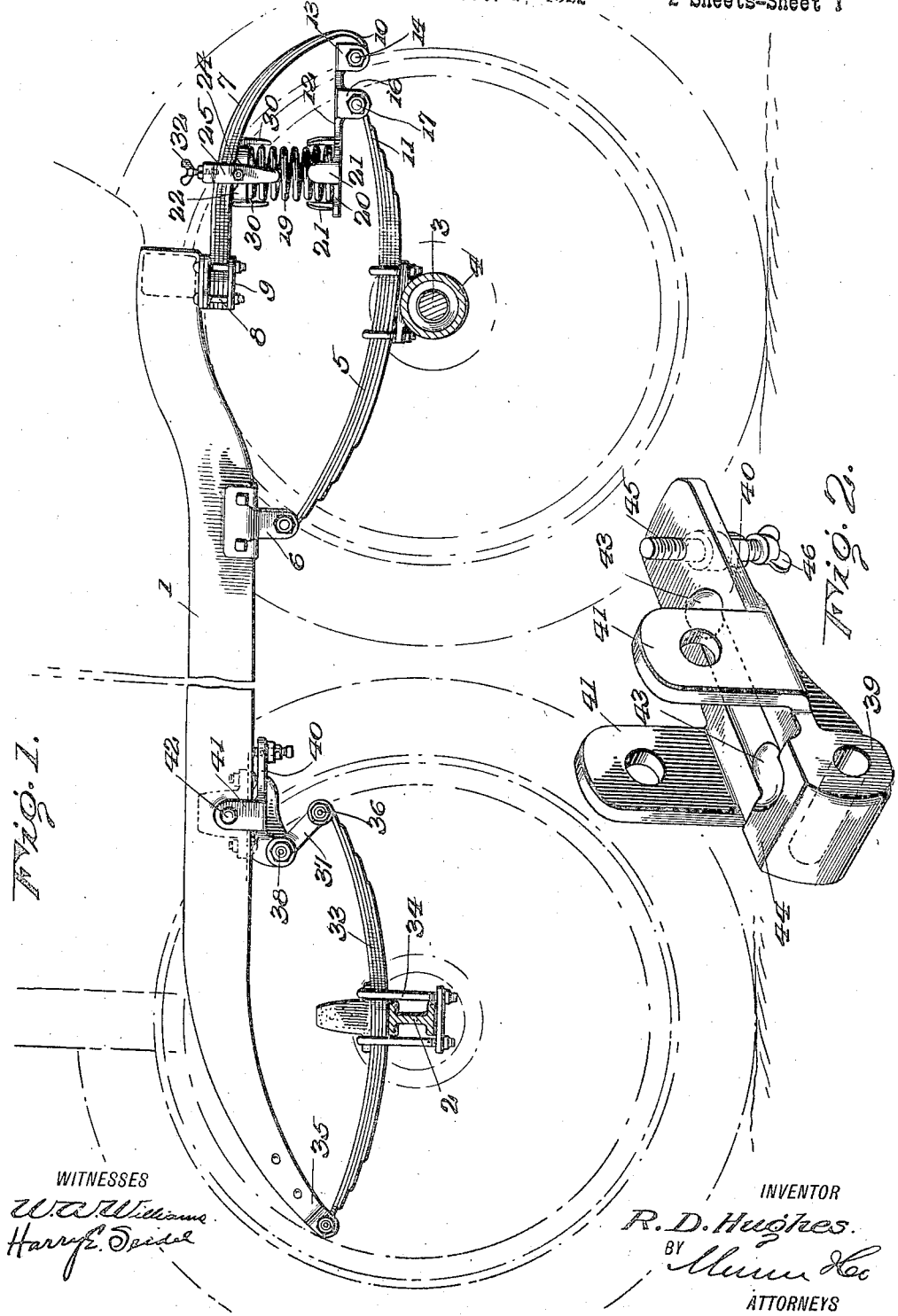
WITNESSES
W. T. Williams
Harry E. Speidel
INVENTOR
R. D. Hughes.
BY
Munn & Co
ATTORNEYS Dec. 18, 1923.　　　　　　　1,477,959
R. D. HUGHES
SHOCK ABSORBER
Filed Oct. 4, 1922　　2 Sheets-Sheet 2
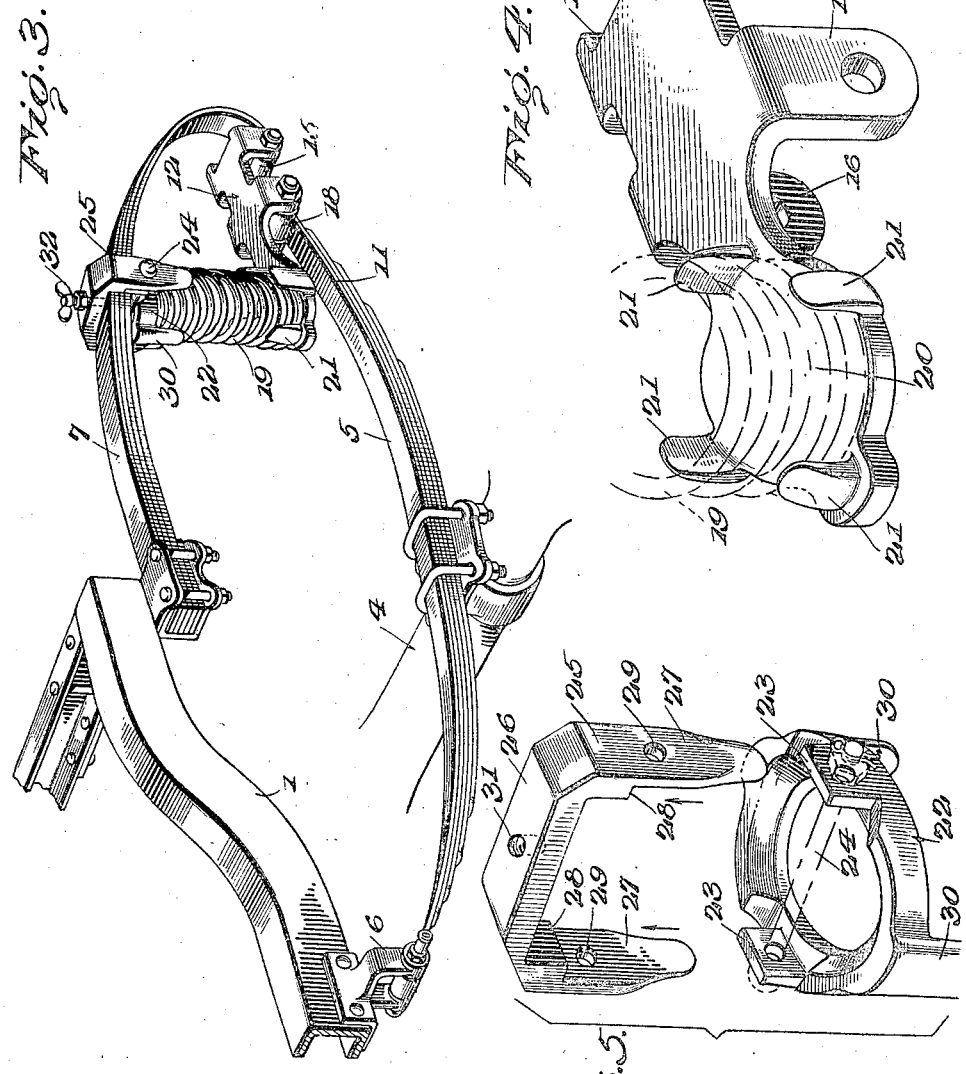
WITNESSES
W. A. Williams.
Harry E. Seidel.
INVENTOR
R. D. Hughes.
BY
ATTORNEYS Patented Dec. 18, 1923.

1,477,959

UNITED STATES PATENT OFFICE.

ROBERT D. HUGHES, OF LYNCHBURG, VIRGINIA.

SHOCK ABSORBER.

Application filed October 4, 1922. Serial No. 592,354.

*To all whom it may concern:*

Be it known that I, ROBERT D. HUGHES, a citizen of the United States, and a resident of Lynchburg, in the county of Campbell and State of Virginia, have invented certain new and useful Improvements in Shock Absorbers, of which the following is a specification.

This invention relates to shock absorbers and has for its object the provision of a device adapted for use in connection with the usual vehicle springs for modifying shocks incident to road travel and which are abruptly imparted to the springs with detrimental effect.

A further object of the invention is the provision of a device for transmitting the destructive motion usually imparted to vehicle springs by road shocks and which frequently cause breakage of the springs, into a motion which will divert the shock from said springs.

Other objects and advantages of the invention will be apparent during the course of the following description.

In the accompanying drawings forming a part of this specification, and in which like reference numerals designate like parts throughout the same, Figure 1 is a side view of the chassis of an automobile with my improved shock absorbers employed in connection with the usual vehicle springs.

Figure 2 is a view in perspective of a bracket for connecting one end of the front vehicle spring to the chassis of an automobile.

Figure 3 is a view in perspective of the rear springs connected together by my improved shock absorber.

Figure 4 is a view in perspective of the oscillating lever forming part of my shock absorber.

Figure 5 is a view in perspective of a combined socket and connecting means for a coil spring with the parts shown separated.

Referring to the drawings, 1 designates a longitudinal channel beam of a Dodge automobile, 2 the front axle and 3 the rear axle. The housing of the rear axle 3 is shown at 4 and to which is secured intermediate its ends a semi-elliptic spring 5. The forward end of the spring 5 is connected, as is usual, to the channel beam 1 by means of a bracket 6.

A cantilever spring 7 has its forward end 8 connected by means of a bracket 9 to the rear end of the channel beam 1.

It will be noted that the free end 10 of the cantilever spring 7 and the rear free end 11 of the semi-elliptic spring are located adjacent to each other. An oscillating lever 12 is provided with two pairs of spaced depending ears. The rear depending ears 13 are provided with a pin 14 adapted to receive the rolled end 15 of the cantilever spring 7 with the rolled end forming an eye through which the pin 14 is inserted. Ears 16, which are located adjacent the center of the lever 12, are perforated to receive a transversely disposed pin 17. The pin 17 receives an eye 18 formed on the outer rear free end of the semi-elliptic spring 5.

The end of the lever 12, which extends beyond the ears 16, is formed into a socket to receive the lower end of a coil spring 19. This socket 20 is provided with a plurality of spaced upstanding ears 21 adapted to embrace the lower end of the coil spring 19 and maintain it in position when the lever 12 operates and the springs 5 and 7 are moved toward or away from each other due to road shocks to the vehicle wheels.

In vertical alinement with the socket 20 is a socket 22 which receives the upper end of the coil spring 19. The socket 22 is in the form of a ring having the upstanding ears 23 at diametrically opposite points which are perforated and through which is inserted a bolt 24.

The yoke 25 comprises a transverse horizontal member 26 and two downwardly depending lugs 27. The lugs are cut-away on their inner wall to form a shoulder 28 which is adapted to be seated on the upper end of the upstanding lugs 23 on the ring 22. Perforations 29 in the lugs 27 are adapted to aline with the perforations in the lugs or ears 23 and the bolt 24 is inserted through the alined perforations and held in position by means of a nut and cotter pin.

The lugs 27 depend downwardly below the bottom of the ring 22 and are adapted to engage the coil spring 19 at diametrically opposite points. The ring 22 is also provided with downwardly depending lugs 30 which are located at an angle of 90° from the lugs 27 and are for the purpose of embracing diametrically opposite points on the spring 19. The two lugs 27 and the two lugs 30 cooperate to maintain the upper ends of the springs in position.

As shown in Figure 3, the cantilever spring 7 is received between the bridge or horizontal member 26 of the yoke 25 and the upper end of the ring 22. The bridge 26 of the yoke is provided with a threaded perforation 31 which is adapted to receive a thumb screw 32. The inner end of the thumb screw engages the upper leaf of the cantilever spring 7 for locking said spring against movement relative to the yoke 25.

When road shocks are received by the rear vehicle wheels shown in dotted lines in Figure 1, the axle 3 will tend to move upwardly toward the channel beam 1 while the channel beam moves downwardly toward the axle. When this occurs the rear end 11 of the semi-elliptic spring 5 will move upwardly and tend to elevate the lever or shackle 12. The downward movement of the cantilever spring 7 tends to lower the rear end of the lever 12. Therefore, the socket 20, formed on the forward end of said lever, is moved upwardly against the tension of the spring 19 and since the cantilever spring 7 is being moved downwardly it will likewise tend to compress spring 19.

It will be seen that the shock usually imparted to the springs 5 and 7 will be sufficiently absorbed through the operation of the lever and the compression of the spring 19 to materially relieve the abrupt shocks to said springs and prevent breakage of the same.

Upon a rebound of the springs 5 and 7 opposite movements of the different parts just described will be had. Springs 5 and 7 will tend to move apart, oscillating the lever 12 with the rear end of the lever being elevated, while the forward end is lowered. This re-action of the springs in combination with the lever 12 and the upward movement of the body of the vehicle will tend to move the rear wheel out of the rut or away from the obstruction and therefore all parts of the car will be saved from destruction by the ease with which the body moves relative to the axle due to the constant tendency of my improved shock absorber to counter balance the destructive effects of a road shock. Since the shock absorber, in combination with the vehicle springs, tend to pull the wheel out of ruts, less gas will be required for operating the engine since less work is thrust upon the same.

It will be seen further that the wear and tear upon a tire will be materially lessened by reason of the fact that the springs in readjusting themselves upon expansion will lift the wheel from a rut or obstruction without the usual action of the vehicle of thrusting the wheels directly against the obstruction and dragging the wheels over the same.

When employing the usual shock absorber as described the tires may be pumped to 65 pounds without any danger of a blow out.

Referring to the front axle it will be seen that a semi-elliptic spring 33 is secured by means of clips 34 to said axle. The forward end of the spring is connected by means of a shackle to the forward end 35 of the channel bar 1. The rear end of the spring 33 is pivotally connected at 36 to a shackle 37. The other end of the shackle is pivotally connected at 38 to a bearing 39 formed on one end of a bracket plate 40. The bracket plate is provided with perforated upstanding ears 41 which are securely locked to the channel frame 1 by means of the bolt 42. The inner face of the plate 40 is provided with indentations 43 which are adapted to receive the heads of bolts projecting from the under surface of the channel frame 1 and which is usual in the Dodge automobile.

The bearing 39 is provided with an elongated projection 44 which is adapted to engage the under side of the channel frame 1 for spacing the plate 40 from the channel frame.

A threaded bolt 45 is received within a threaded perforation in the rear end of the plate 40 and is provided with an operating head 46 adapted to be gripped by some suitable instrument for turning the screw 45, which engages the under face of the channel beam 1, for forcing the rear end of the plate 40 outwardly from the channel beam for rigidly locking said plate in position on the under face of the channel beam.

When road shocks are imparted to the front wheels the axle 2 is moved relative to the channel beam 1 whereby the rear end of the spring 33 is adapted to oscillate with the shackle 37 pivotally connected at 38 directing the line of movement of the rear end of the spring 33. The shackle 37 causes the end of the spring to move through an arc of a circle which prevents the shocks usually imparted to the front springs from causing breakage of said springs through not only the oscillating vertical movement of the rear end of the spring 33 but also through its horizontal movement, the combined movements providing a movement which is along the arc of a circle.

The shackle 37 is disposed at an acute angle to both the spring 33 and to the channel frame 1 and the angular position of the shackle relative to these members permits the rear end of the spring to move freely and prevent breakage of said spring.

What I claim is:

1. In a spring suspension for vehicles, a semi-elliptic spring, a cantilever spring, a lever mounted intermediate its ends on one end of the semi-elliptic spring, one end of the lever being pivotally connected to the free end of the cantilever spring, a socket on the other end of the lever, a coil spring having one end seated in the socket, a yoke straddling a resilient portion of the cantilever spring, a socket member suspended from the yoke, with the other end of the coil spring mounted in the socket member, and a clamping means on the yoke engaging the cantilever spring for locking the yoke in position on the cantilever spring.

2. In a spring suspension for vehicles, a semi-elliptic spring, a cantilever spring, a lever pivotally mounted intermediate its ends on one end of the semi-elliptic spring, one end of the lever being pivotally connected to the free end of the cantilever spring, a socket on the other end of the lever, a coil spring having one end seated in the socket, a yoke comprising a bridge and depending legs straddling a resilient portion of the cantilever spring intermediate its ends, a socket member removably suspended from the yoke with the yoke and socket member embracing the cantilever spring, means on the yoke engaging the cantilever spring for locking the yoke and the socket member in position on the cantilever spring, the other end of the coil spring being mounted in the last mentioned socket member.

3. In a spring suspension for vehicles, a semi-elliptic spring, a cantilever spring, a lever pivotally mounted intermediate its ends on one end of the semi-elliptic spring, one end of the lever being pivotally connected to the free end of the cantilever spring, and a resilient means connecting the other end of the lever with a resilient portion of the cantilever spring and at a point on the spring intermediate its ends.

4. In a spring suspension for vehicles, a semi-elliptic spring, a cantilever spring, a lever pivotally mounted intermediate its ends on one end of the semi-elliptic spring, one end of the lever being pivotally connected to the free end of the cantilever spring, a resilient means connecting the other end of the lever with a resilient portion of the cantilever spring at a point on said spring which is intermediate its ends, and means for locking the resilient means in position on the cantilever spring.

5. In a spring suspension for vehicles, a semi-elliptic spring, a cantilever spring, a lever pivotally mounted intermediate its ends on one end of the semi-elliptic spring, one end of the lever being pivotally connected to the free end of the cantilever spring, the free end of the lever being provided with spaced upstanding lugs forming a socket, a coil spring having its lower end received by the lugs on the free end of the lever, a socket member rigidly connected to the cantilever spring intermediate its ends and provided with depending lugs adapted to embrace the other end of the coil spring, whereby said coil spring is compressed between the end of the lever and the intermediate portion of the cantilever spring.

6. In a spring suspension for vehicles, a shock absorber comprising a lever provided with a depending ear located intermediate its ends adapted to be connected to one end of a vehicle spring, depending ears formed on one end of said lever and adapted to be connected to the free end of another vehicle spring, the opposite end of the lever being provided with spaced upstanding lugs, a coil spring having its lower end seated on the free end of the lever and embraced by the upstanding lugs, a socket member adapted to receive the other end of the coil spring and comprising a ring having upstanding ears, lugs projecting at diametrically opposite points and downwardly from the ring, a yoke comprising a bridge member, legs depending from said bridge member, the inner walls of the legs being provided with shoulders adapted to seat upon the upstanding ears on the ring, the upstanding ears and legs being provided with alined perforations and securing means fastened through the alined perforations for locking the yoke to the ring, and means on the bridge member of the yoke for securing the yoke and likewise the ring in position on a vehicle spring.

ROBERT D. HUGHES.